June 27, 1939.  G. R. COLEMAN  2,163,586

JOURNAL BEARING

Filed Oct. 19, 1936  2 Sheets-Sheet 1

INVENTOR.
Gilbert R. Coleman
BY
Charles B. Rasmussen
ATTORNEY.

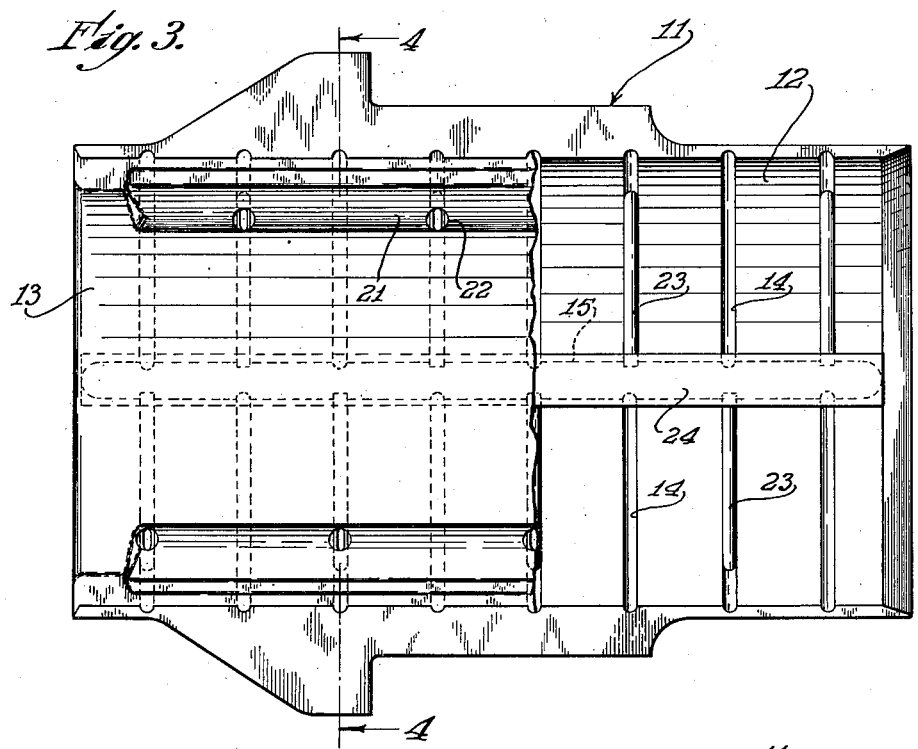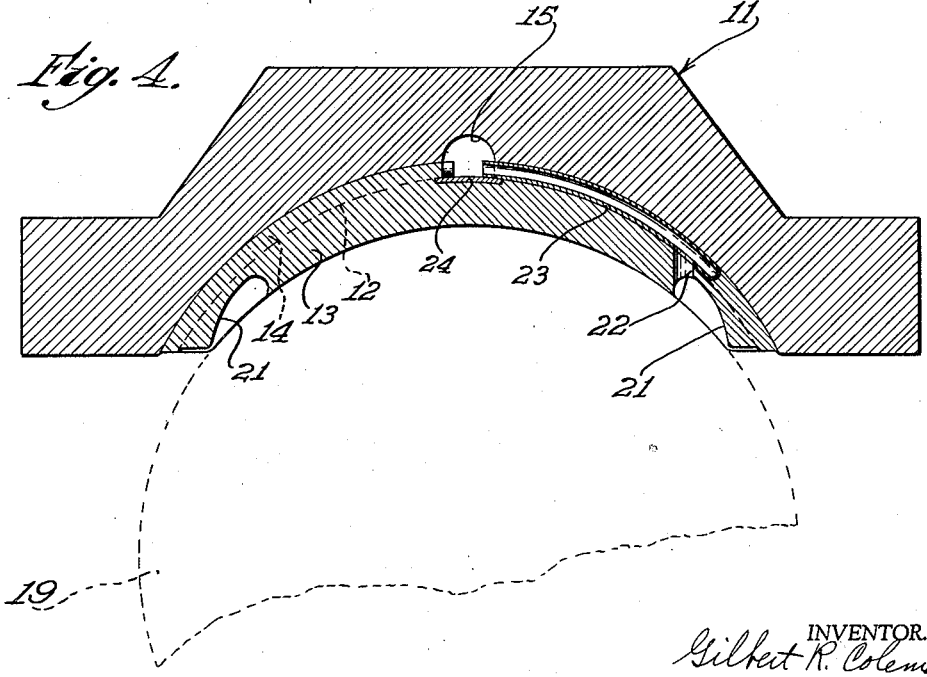

Patented June 27, 1939

2,163,586

UNITED STATES PATENT OFFICE 2,163,586

JOURNAL BEARING

Gilbert R. Coleman, Bellevue, N. Y.

Application October 19, 1936, Serial No. 106,458

5 Claims. (Cl. 308—79.1)

This invention relates in general to improvements in bearings and, while it has more particular reference to journal bearings used on railway rolling stock, it will be apparent that certain features of the invention have other and more general applications.

A principal object of the invention is the provision of improved means for automatically cooling a journal bearing in the most effective manner.

As is pointed out more specifically in my copending application for U. S. Letters Patent, Serial No. 67,063, filed March 4, 1936, that portion of a journal bearing which is most affected by the heat generated during the operation thereof is the bonded surface between the main body portion and the lining secured thereto. To insure effective cooling of this bonded surface, the above-mentioned application provides separate conduits extending through the bearing adjacent said surface which serve as passageways for the automatic circulation of lubricating oil through the bearing from the inbound to the outbound side of the journal. These conduits are constructed of a material which is impervious to the action of the lubricating oil, and are arranged so that there is substantially no possibility of the lubricating oil coming in contact with the bonded surface between the main body portion and the lining. These latter features are employed because the lubricating oil has a deteriorating action on the solder or other bond employed and will cause the latter to disintegrate with a consequent failure of the bearing.

More specifically, therefore, the object of the instant invention is the provision of an oil cooling reservoir in such a bearing adjacent the central or crown portion of said bonded surface, which communicates with said conduits and is so formed as to substantially eliminate the possibility of the lubricating oil coming in contact with the bonded surface.

Another important object of the invention is the provision of a novel method of manufacturing and repairing such a journal bearing.

Numerous other objects and advantages of the invention will be apparent as it is better understood from the following description, which, when taken in connection with the accompanying drawings, discloses a preferred embodiment thereof.

In the drawings:

Fig. 3 is a view similar to Fig. 1 of a modified form of bearing; and

Fig. 4 is a vertical section taken substantially on the line 4—4 of Fig. 3.

Figure 1:
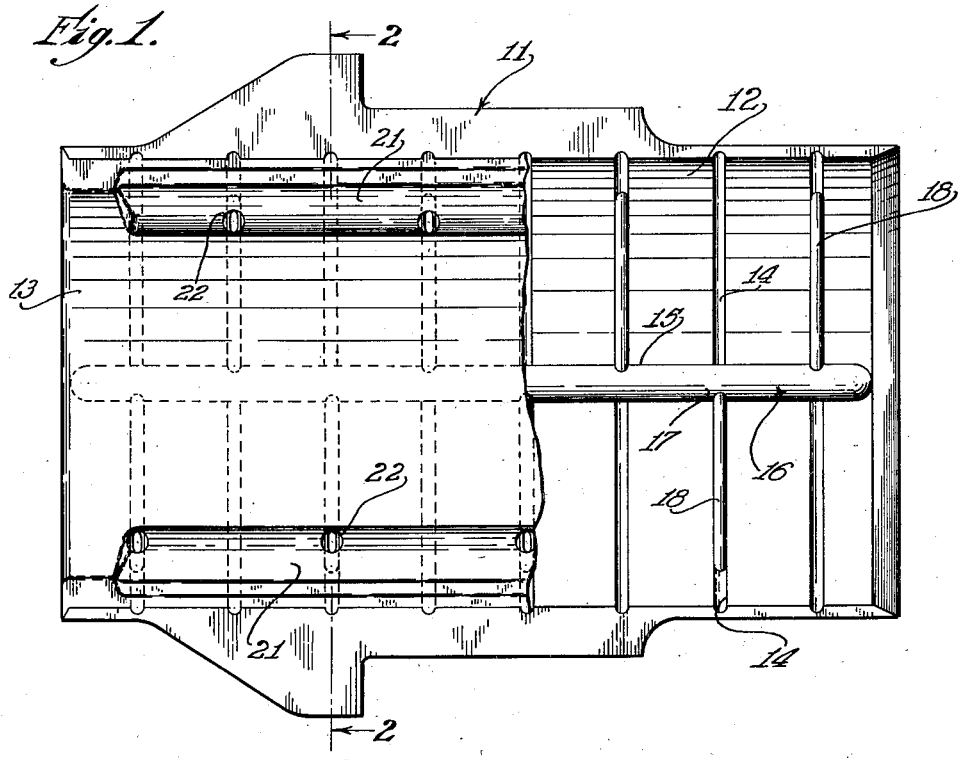
Figure 1 is a bottom plan view of a journal bearing embodying the features of the invention with part of the lining broken away to show the conduits mounted in the grooves in the concave surface of the main body portion.

Referring more particularly to the drawings, reference numeral 11 indicates the body portion of a non-rotary member of a journal bearing, commonly called the "brass", which may be of any desired form and is preferably cast from some suitable alloy. The body portion 11 is provided with a lower concave surface 12 to which is applied a lining 13 of babbitt or other suitable material, which is applied in the usual manner to the surface 12 after it has been tinned or soldered so that it will adhere firmly thereto.

Formed in the lower surface 12 of the main body portion 11, by machining or by being cast therein, are a plurality of transverse grooves or channels 14 interconnecting at their central portions with a longitudinal channel or groove 15. Any desired number of these grooves 14 may be provided and they are preferably spaced in parallel relationship to each other and extend completely across the lower surface 12. The grooves 14 and 15 are preferably substantially semi-circular in cross-section, with the central longitudinal groove 15 of somewhat larger diameter than the transverse grooves 14.

Figure 2:
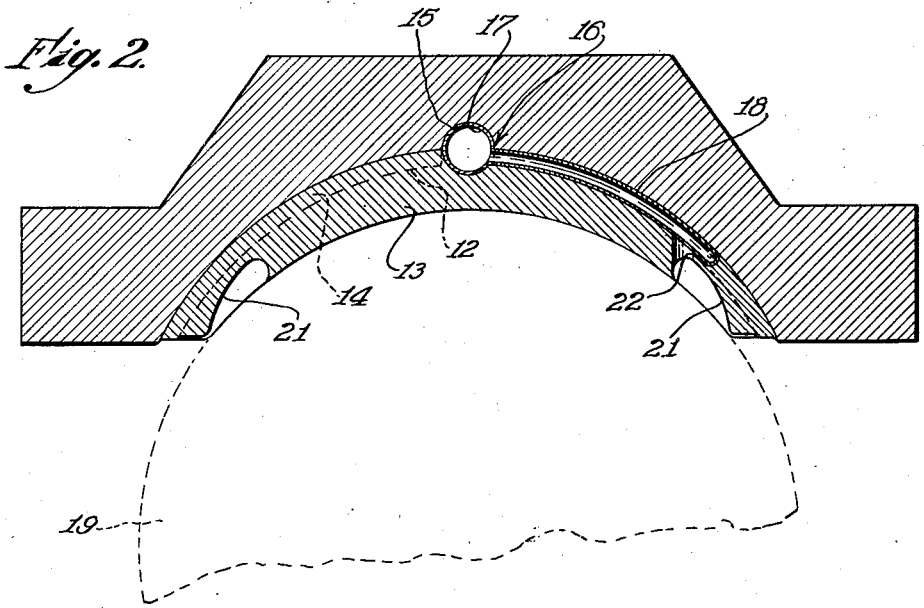
Fig. 2 is a vertical section taken substantially on the line 2—2 of Fig. 1.

In the form of journal shown in Figures 1 and 2, a unitary assemblage of interconnecting closed tubular members, indicated generally by reference numeral 16, is positioned within the grooves 14 and 15. This assemblage 16 preferably comprises a central tube 17 which is positioned within the longitudinal groove 15, and a plurality of laterally extending curved tubes 18 formed integrally with and communicating with the central tube 17 and adapted to be positioned within the transverse grooves 14. As shown in Figure 1, the transverse tubes 18 are disposed within alternate grooves 14 on opposite sides of the central tube 17. While this arrangement is preferred, any other suitable one may be employed that is desired. The tubular assemblage 16 is preferably formed of metal tubing, such as copper, although any other suitable material, which is impervious to the action of the oil used for lubricating the bearing, and shape may be employed. The outer ends of the tubes 17 and 18 are closed.

The tubular assemblage 16 may be positioned in the grooves 14 and 15 either before or after the surface 12 is tinned. The lining 13 is then molded or otherwise secured to the main body portion 11 to maintain the tubular assemblage 16 in place. Those portions of the grooves 14 which are not filled by the tubes 18 will function as additional retaining means for the lining, since the latter will fill any such portions of the grooves, as will be seen particularly in Figure 2.

The lower surface of the lining 13 is formed to substantially conform to the upper portion of the usual journal 19 (shown in broken lines in Figures 2 and 4) in a well known manner. A pair of longitudinally extending grooves or channels 21 are machined or molded in this lower surface of the lining 13, and terminate short of the ends of the lining as best seen in Figure 1, although they may be extended to either or both ends of the lining if desired. Referring to Figures 2 and 4, the channels 21 are preferably curved in cross-section to provide a fish hook shaped inner surface, the deepest portion of which is at the upper part of the channel while the lower part of the channels terminates at a point which is spaced a short distance away from the outer surface of the journal 19. The particular shape of these channels 21 and their function are more specifically described in my co-pending application above referred to. An aperture or bore 22 communicates between the upper portion of each groove or channel 21 and each of the tubes 18. These bores 22 are preferably drilled through the lining 13 and into the conduits or tubes 18 as a final step in the manufacture of the bearing.

The modified form of bearing shown in Figures 3 and 4 is identical to that above described, with the exception of the particular type of conduits employed. In this modification, transverse tubes 23 are used which are similar to the tubes 18. Instead of the central longitudinal tube 17, however, a longitudinally disposed plate member 24 is employed. The tubes 23 are positioned in the grooves 14 with their centrally disposed ends, which are open, terminating within the central groove 15. The plate 24 is shaped to conform to the contour of the curved surface 12 and is placed so as to completely cover the central groove 15 and the open ends of the transverse tubes or conduits 23. The tubes 23 and the plate 24 may be secured together in any suitable manner if desired to form a unitary assemblage somewhat similar to the tubular assemblage 16. However, the members 23 and 24 may be separately placed in their positions in the grooves 14 and over the groove 15, respectively. As in the case of the assemblage 16, these parts may be so positioned either before or after the surface 12 is tinned. The lining 13 is then molded or otherwise secured to the body portion 11 to maintain the members 23 and 24 in place. In this modification the bores 22 communicate with the tubes 23 in the same manner as with the tubes 18.

In this type of journal bearing, lubricating oil is supplied to the outer surface of the journal 19 in the usual manner by means of saturated waste disposed within the journal box (not shown) and contacting the lower surface of the journal, although any other means of supplying a lubricant may be employed if desired.

In the operation of the bearing, rotation of the journal 19 will carry oil into the channel 21 at the inbound side of the journal. The oil will be collected in this inbound channel and will be forced through the associated apertures 22 into the tubes or conduits 18 or 23, and thence into the central longitudinal reservoir provided by the tube 17 in the one modification and the groove 15 and plate 24 in the other modification. From these central cooling reservoirs the oil will flow through the opposite tubes or conduits 18 or 23 into the channel 21 at the outbound side of the journal and be carried by the latter downwardly to the waste referred to.

This circulating action of the lubricating oil will effectively cool the bearing while assuring uniform distribution of the oil. The provision of the centrally disposed longitudinal cooling reservoir in the bearing materially adds to this cooling effect in an obvious manner, and results in a certain amount of the oil being retained therein when the journal is not in operation.

The above described arrangement of the tubular assemblage 16 and the members 23 and 24 is such that there is substantially no possibility of the lubricating oil coming in contact with the bonded surface 12 between the main body portion 11 and the lining 13. In this manner the deteriorating action of the lubricating oil on the solder or other bond employed is effectively prevented. The provision of the centrally disposed longitudinal reservoir in the bearing adjacent the bonded surface 12 results in a very much more satisfactory and effective cooling of the bearing than is accomplished by the arrangement of the transverse conduits alone shown in my co-pending application above referred to.

In the relining of the bearing, the removal of the lining 13 by use of heat or the like will remove the members 16 or 23 and 24 from the main body portion 11. The addition of a new lining to the body portion will therefore be a relatively simple matter, and as is the case in the initial manufacture, the problem of keeping the lining metal from clogging the conduits will not be presented.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A journal bearing, comprising a body portion having a concave surface, a longitudinally extending groove formed in said surface, a plurality of transversely extending grooves formed in said surface and communicating with said longitudinal groove, a plurality of conduits mounted in said transverse grooves and opening into said longitudinal groove, a plate member completely covering said longitudinal groove, the open ends of said conduits being disposed above said plate member, a lining cast on said concave surface and securely attached to said body, whereby said lining maintains said conduits and plate member in position, a longitudinal channel in each side of said lining, and apertures extending through said lining and connecting said conduits and said channels.

2. A journal bearing, comprising a body portion having a concave surface, a lining cast on said concave surface and having an exposed bearing surface and securely attached to said portion, a longitudinally extending reservoir disposed within said bearing adjacent the surface between said body portion and said lining, a pair of longitudinally extending channels in said exposed bearing surface, and a plurality of passageways interconnecting each of said channels with said reservoir, said passageways each comprising a separate conduit disposed adjacent the surface between said body portion and said lining and maintained in position by the lining.

3. A journal bearing, comprising a brass having a concave surface, a plurality of transversely extending grooves in said surface, a longitudinally extending groove in said surface adjacent the center thereof, a tube in each of said grooves, said transversely extending tubes each communicating with said longitudinally extending tube, a lining cast on said concave surface and securely attached to said brass, whereby said lining maintains said tubes in position and fills the portions of the grooves around the tubes to increase the mechanical strength of the bond between the lining and the brass, a longitudinal channel in each side of said lining, and apertures extending through said lining and connecting said transversely extending tubes and said channels.

4. A journal bearing of the type where lubricating oil is carried upwardly by the surface of the journal to the bearing, comprising a brass having a bonded concave surface with a plurality of transversely extending grooves and a longitudinally extending groove therein, a tube disposed in each of said grooves made of a material which is impervious to any deteriorating action of the oil, said transversely extending tubes communicating with said longitudinally extending tube, a lining cast on said bonded surface and thus securely attached to said brass to retain said tubes in place, a longitudinally extending channel in each side of the bearing surface of said lining, and apertures extending through said lining and said transversely extending tubes to interconnect said tubes and said channels, whereby rotation of said journal will cause oil to flow through said bearing adjacent said bonded surface to cool the latter and to maintain a supply of oil in said longitudinally extending tube, while contact of the oil with said bonded surface will be substantially eliminated.

5. A journal bearing of the type where lubricating oil is carried upwardly by the surface of the journal to the bearing, comprising a brass having a soldered concave surface with a plurality of transversely extending grooves and a longitudinally extending groove therein, a unit comprising a plurality of copper tubes disposed in said transversely extending grooves and a copper tube communicating therewith and disposed in said longitudinally extending groove, a bearing metal lining cast on said soldered surface and thus securely attached to said brass to retain said tube unit in place, a longitudinally extending, oil-collecting channel in each side of the bearing surface of said lining, and apertures extending through said lining and said transverse tubes to interconnect said tube unit and said channels, whereby rotation of said journal will cause oil to flow through said tubes adjacent said soldered surface to cool the latter and to maintain a supply of oil in said longitudinal tube, while contact of the oil with said soldered surface will be substantially entirely eliminated.

GILBERT R. COLEMAN.